United States Patent [19]

Shalev

[11] Patent Number: 5,240,620

[45] Date of Patent: Aug. 31, 1993

[54] METHOD AND APPARATUS FOR FILTERING WATER

[76] Inventor: Amnon Shalev, 21900 Marylee St. #244, Woodland Hills, Calif. 91367

[21] Appl. No.: 769,876

[22] Filed: Oct. 1, 1991

[51] Int. Cl.⁵ .................... B01D 37/00; B01D 24/00
[52] U.S. Cl. .................... 210/767; 210/807; 210/244; 210/282; 210/473; 210/474
[58] Field of Search ............... 210/282, 464, 466, 473, 210/244, 474, 767, 807; 222/189, 129.1

[56] References Cited

U.S. PATENT DOCUMENTS

| | | | |
|---|---|---|---|
| 466,809 | 1/1892 | Stone | 210/244 |
| 2,167,225 | 11/1936 | Van Eweyk | 210/473 |
| 2,502,298 | 2/1946 | White | 210/474 |
| 4,995,975 | 2/1991 | Jacquot et al. | 210/282 |
| 5,173,192 | 12/1992 | Shalev | 210/767 |

FOREIGN PATENT DOCUMENTS

| | | | |
|---|---|---|---|
| 16259 | of 1909 | United Kingdom | 210/473 |
| 8908083 | 9/1989 | United Kingdom | 210/244 |
| 2228260 | 8/1990 | United Kingdom | 210/244 |

*Primary Examiner*—Robert A. Dawson
*Assistant Examiner*—Ana M. Fortuna
*Attorney, Agent, or Firm*—Freilich Hornbaker Rosen

[57] ABSTRACT

A tap water filter apparatus (30) and a method of use thereof are provided. The apparatus is placed between a beverage container (20) filled with tap water and an empty beverage container (40). The combination is then inverted and water is filtered through filter media (52) in the apparatus into the previously empty container. The apparatus defines spouts (32, 44) that retain the containers in place. The apparatus also defines a skirt (60) that automatically controls water flow through the apparatus.

18 Claims, 5 Drawing Sheets

METHOD AND APPARATUS FOR FILTERING WATER

FIELD OF THE INVENTION

The present invention pertains to a method and apparatus for filtering water, and more particularly, to portable apparatus adapted for low flow rate filtering.

BACKGROUND OF THE INVENTION

It has become increasingly popular to purchase bottled spring water, mineral water and other purified waters as a replacement for tap water which may contain undesirable chemicals and other contaminants. Such waters are supplied in beverage containers varying in size, typically, from 350 milliliters to 2 liters but which may be as large as 5 gallons.

Additionally, a variety of tap water filtering devices are widely commercially available for permanent or semipermanent installation in the home and office. Such devices are variously intended to service an entire household, a sink, a faucet and a refrigerator ice maker water supply line.

Many of these devices utilize granular activated carbon filters to remove organic chemicals (e.g. chlorine, hydrogen sulphide, pesticides, herbicides, phenol, chlorophenol and hydrocarbons) from water. An additional filter may be directed to the removal of sediments such as rust and other particles.

SUMMARY OF THE INVENTION

The present invention is directed to a method and apparatus for enabling an individual user to conveniently fill readily available beverage containers with filtered tap water and thus eliminate the user's need to purchase bottled water and/or install permanent or semipermanent filter devices.

In accordance with the invention, an empty dispensing container is initially filled with tap water. An entrance spout of a preferred filter apparatus embodiment is then coupled to the opening of the dispensing container. An empty receiving container is then coupled to the filter apparatus exit spout and the container/filter apparatus assemblage is inverted. As a consequence, water will flow from the dispensing container through the entrance spout, through filter media within the apparatus and through the exit spout into the receiving container.

In accordance with a feature of the preferred apparatus embodiment, the exit spout is configured to receive the opening of different sized containers.

In accordance with another feature of the preferred apparatus embodiment, it is configured to prevent water overflow when the apparatus and containers are inverted.

The novel features of the invention are set forth with particularity in the appended claims. The invention will be best understood from the following description when read in conjunction with the accompanying drawings.

DETAILED DESCRIPTION

Figure 1:
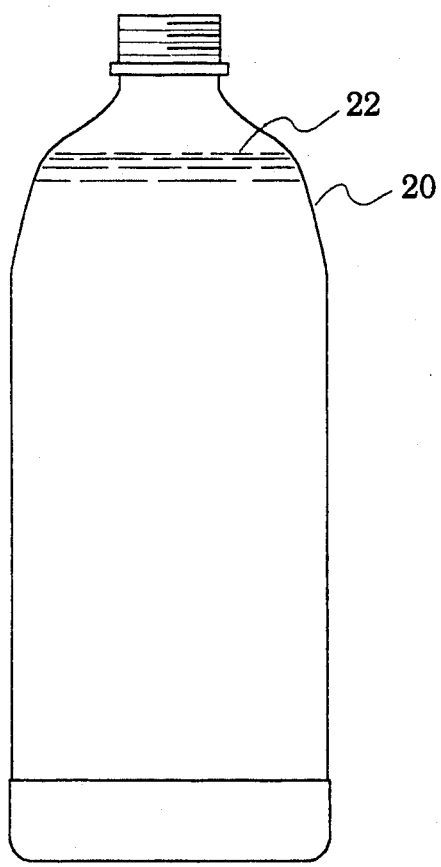
FIG. 1 is an elevation view of a one liter plastic beverage container filled with tap water.

Plastic beverage containers such as that shown in FIG. 1 are used in great numbers in the sale of beverages (e.g. spring water, mineral water, colas and fruit juices) and are readily available in the home and workplace. These containers typically vary in size from 350 milliliters to 2 liters with opening inner diameters in the range of ¾ of an inch to one inch (other beverage containers vary up to 5 gallons in size). A simple economical method and apparatus for utilizing such containers to filter water is disclosed herein. This provides an attractive alternative, in obtaining safe drinking water, to the purchase of bottled water or the installation of a tap water filtering device.

Figure 2:
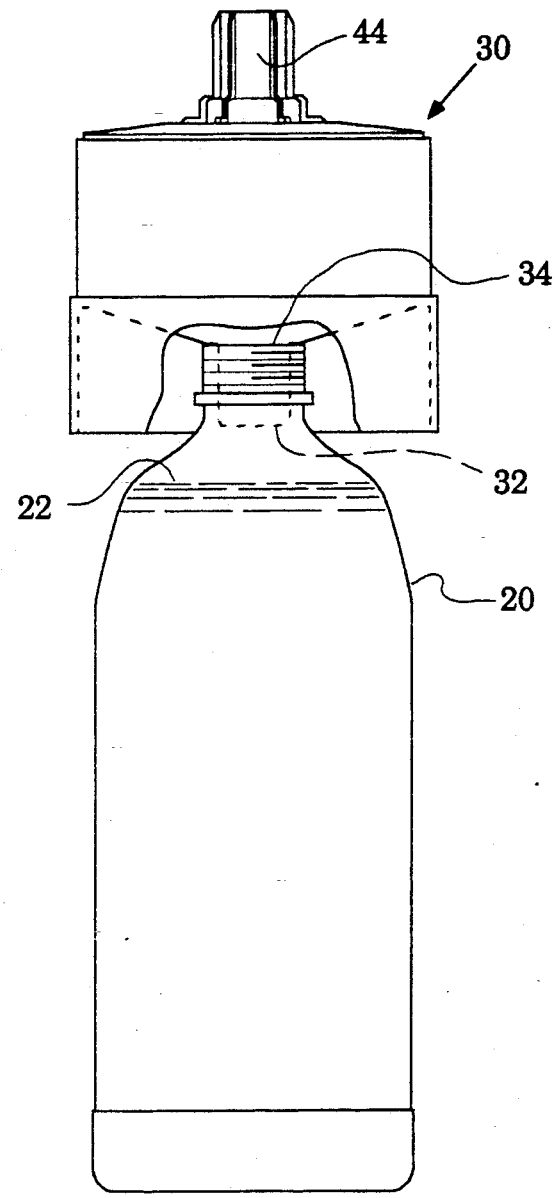
FIG. 2 is an elevation view of a preferred filter apparatus embodiment, in accordance with the present invention, disposed on the container of FIG. 1.
Figure 3:
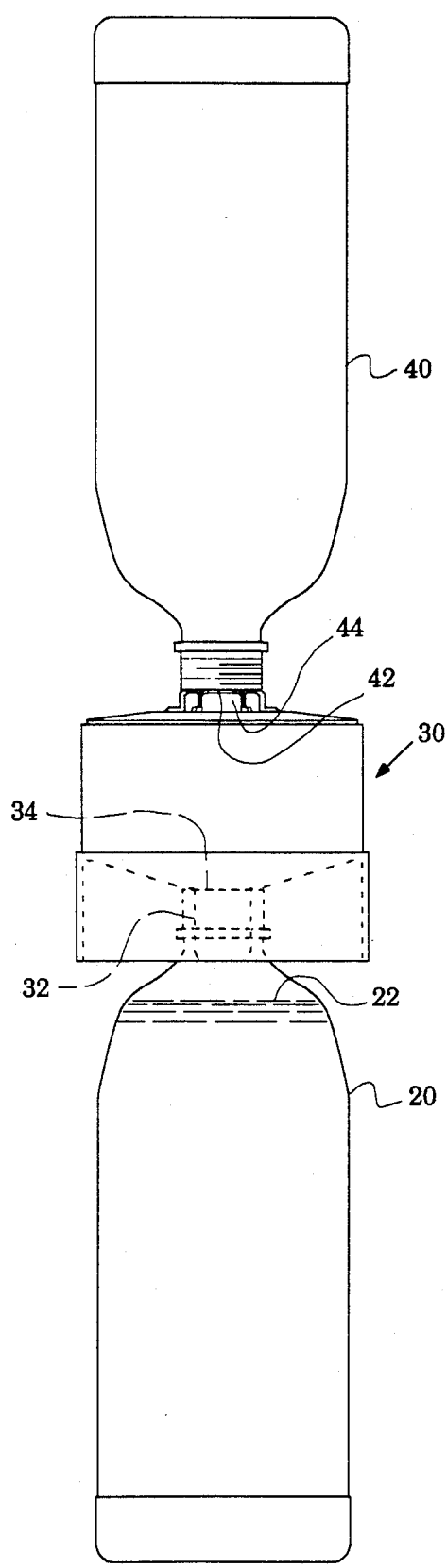
FIG. 3 is an elevation view of an empty one liter beverage container disposed on the filter apparatus and container of FIG. 2.

The method of filtering tap water is illustrated in the elevation views of FIGS. 1-5. FIG. 1 illustrates the dispensing container 20 filled with tap water 22. FIG. 2 illustrates a filter apparatus embodiment 30, in accordance with the present invention, disposed with an entrance spout 32 thereof inserted in the opening 34 of the container 20. FIG. 3 illustrates an empty one liter plastic beverage container 40 mounted with its opening 42 over an exit spout 44 of the filter apparatus 30.

Figure 4:
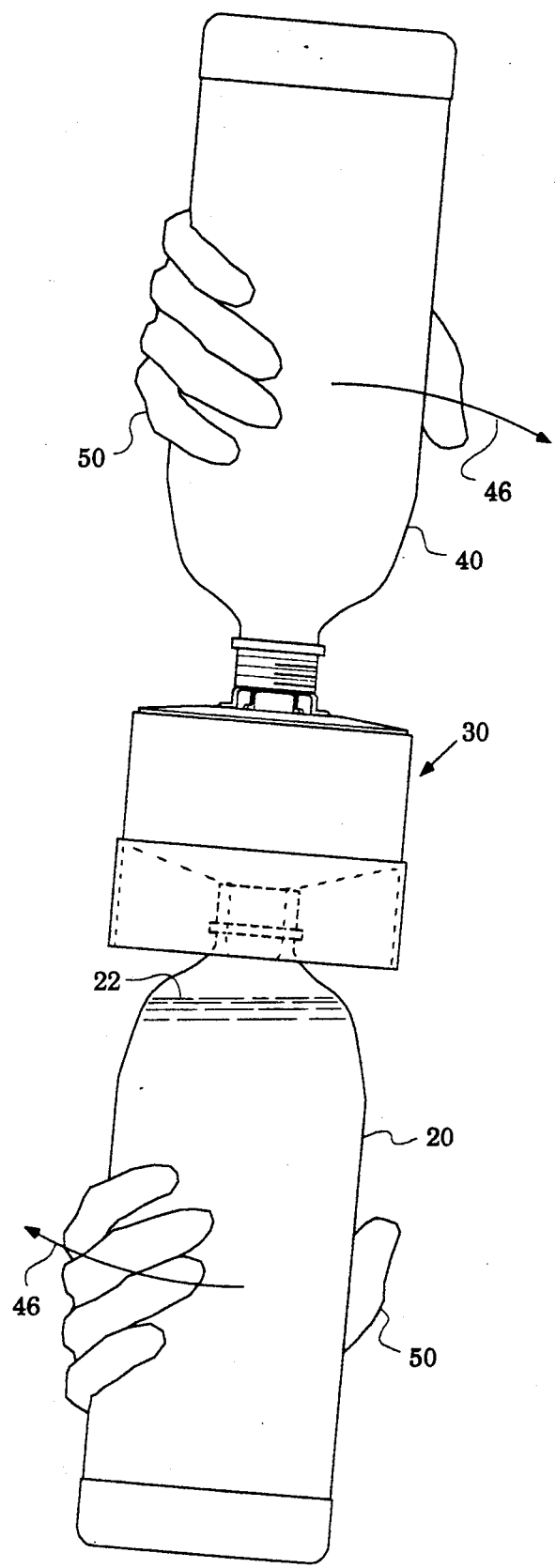
FIG. 4 illustrates inversion of the apparatus and containers of FIG. 3.

In FIG. 4 the combined full container 20, filter apparatus 30 and empty container 40 are shown in the process of being inverted (e.g. by moving in directions 46) by the hands 50 of a user of the filter apparatus.

Figure 5:
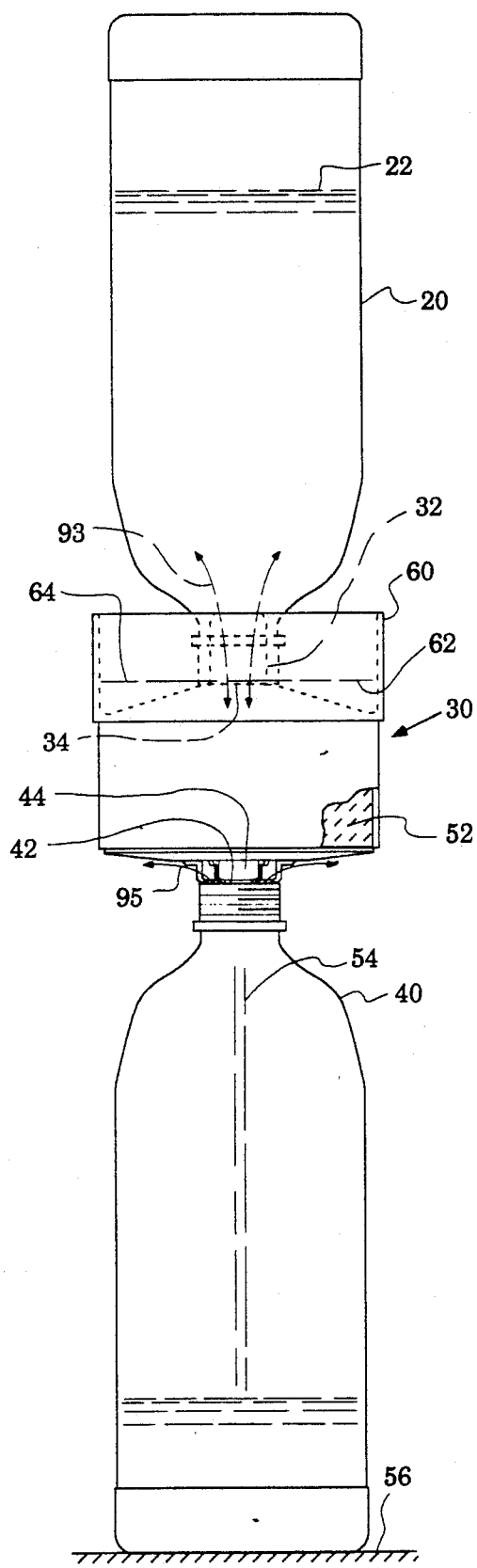
FIG. 5 is an elevation view of the inverted apparatus and containers of FIG. 3 illustrating the flow of filtered water into the previously empty container.

FIG. 5 illustrates the inverted container 20, filter apparatus 30 and container 40. Tap water 22 from the container 20 flows through the entrance spout 32 into filter media 52 disposed within the filter apparatus 30. The resultant filtered water 54 then flows from the filter media 52 through the exit spout 44 into the previously empty container 40.

The container 20, the filter apparatus 30 and the container 40 are retained in the position shown in FIG. 5 by the entrance and exit spouts 32, 44 and may be left on a surface 56 until all of the tap water 22 has been filtered through the filter media 52 and deposited in the container 40. A buffer 60 is defined by the filter apparatus 30 to accommodate a water pool that rises to a level 62 about the container opening 34. Atmospheric pressure on the water surface 64 then automatically prevents water overflow.

Thus the filter apparatus 30 enables an simple economical method for filtering of tap water using containers 20, 40 that are in common everyday use. The filter media 52 may be any of various available types (e.g. granular activated carbon for removal of organic chemicals). Only a few moments are required to set up the structure shown in FIG. 5 and no further attention is required until the container 40 has been filled with filtered water. Several such containers could be filled in a short time and stored in a refrigerator providing filtered water for several days.

Figure 6:
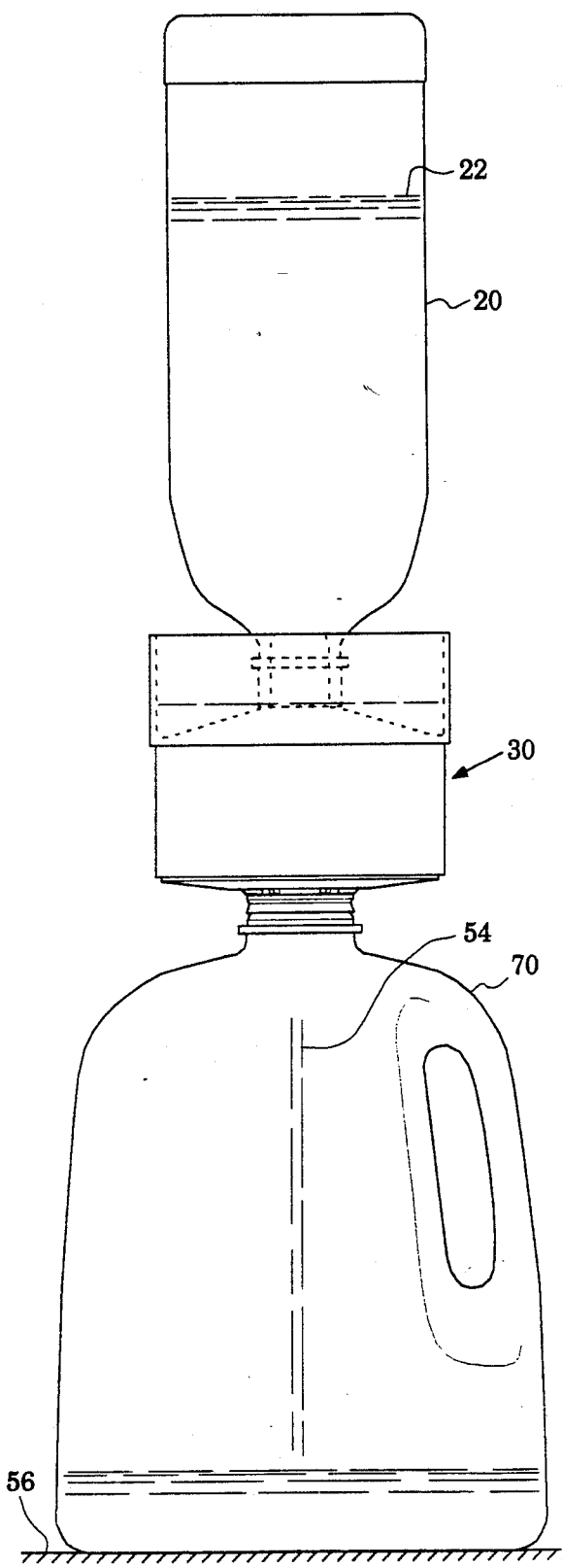
FIG. 6 is a view similar to FIG. 5 with the substitution of a one gallon beverage container to receive filtered water.

As illustrated in FIG. 6, other common containers such as the plastic one gallon container 70 (often used in the sale of products such as milk and distilled water) may be used in the filtering method enabled by the filter apparatus 30. FIG. 6 is similar to FIG. 5 with the container 40 replaced by the container 70. Such one gallon containers typically have an opening diameter in the range of one inch to one and ¼ inches.

Figure 7:
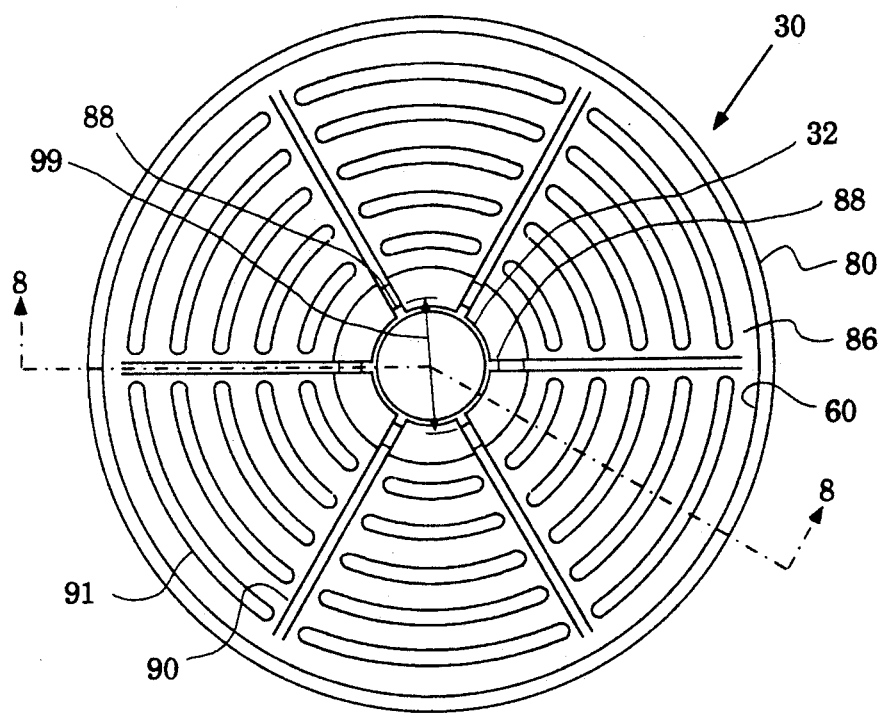
FIG. 7 is a top plan view of the filter apparatus of FIG. 2.
Figure 8:
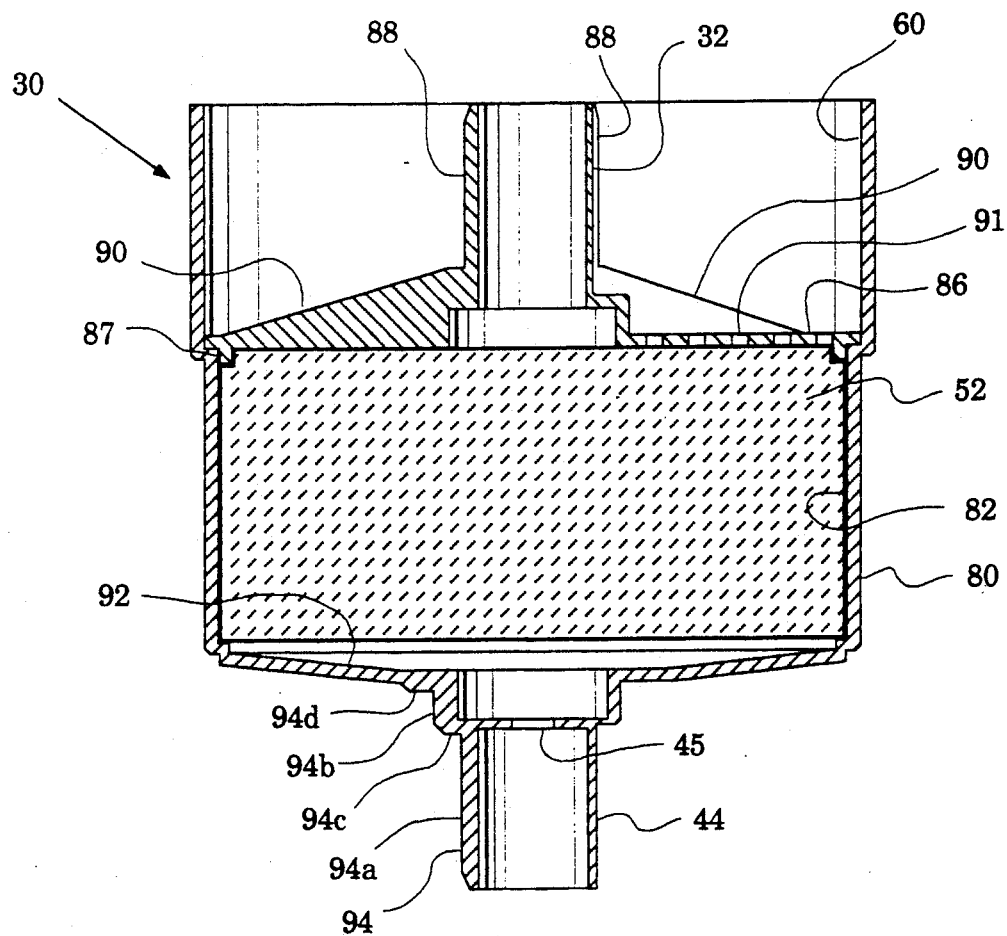
FIG. 8 is a view along the bent plane 8—8 of FIG. 7.
Figure 9:
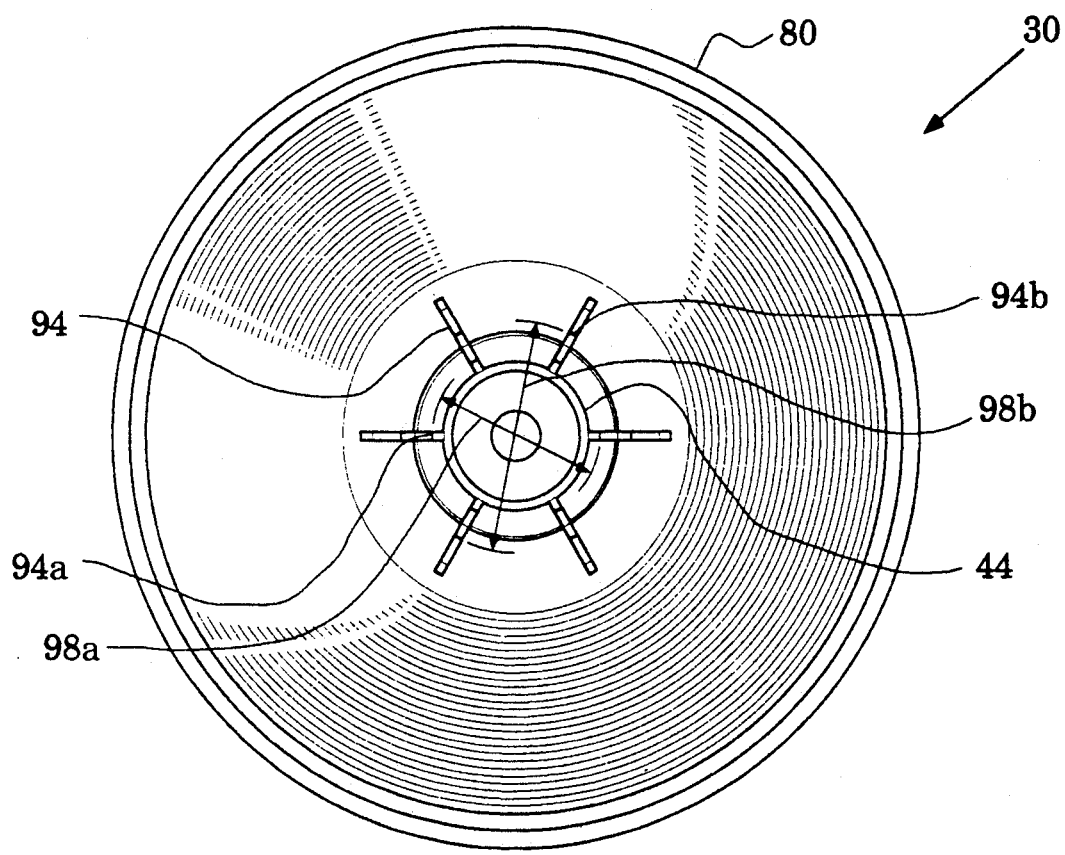
FIG. 9 is a bottom plan view of the filter apparatus of FIG. 7.

The filter apparatus 30 is shown in detail in FIG. 7 which is a top plan view, FIG. 8 which is a view along the bent plane 8—8 of FIG. 7, and FIG. 9 which is a bottom plan view. These figures illustrate an enclosure 80 configured to define a cavity 82, the exit spout 44 which communicates with the cavity 82 and a reduced aperture 45 within the exit spout 44. Filter media 52 is accommodated within the cavity 82 which is covered by a cap 86 defining the entrance spout 32. The cap 86 also defines an annular rim 87 that is closely received in the cavity 82. The enclosure 80 further defines the buffer 60 referred to above in the description relative to FIG. 5.

The filter media 52 may be self supporting, contained within a permeable casing or loosely contained above a louvered floor disposed above the exit spout 44. Although it is contemplated that the entire filter apparatus 30 is constructed to be discarded after a suitable period of use, it is also recognized that the cap 32 may be removable for replacement of the filter media 52.

The entrance spout 32 defines a plurality of radially extending ribs 88 which terminate at their lower end in vanes 90 that extend radially over the cap 86. The vanes 90 abut the end of the dispensing container (20 in FIG. 5) and direct the flow of water therefrom over slots 91 defined in the cap 86. Water 22 from the dispensing container 20 also flows through the entrance spout 32. Thus water 22 is distributed through the entrance spout 32 and the slots 91 to filter throughout the filter media 52. The enclosure bottom 92 is slanted to direct filtered water 54 through the exit spout 44.

Flow rate of water through the apparatus 30 is determined primarily by the filter media 52 and dimensions of the slots 91, the entrance spout 32 and the aperture 45. As described above, relative to FIG. 5, the buffer 60 accommodates a water pool above the cap 86. The water pool can only accumulate to a height defined by the dispensing container opening 34 at which point atmospheric pressure on the water surface 64 prevents overflow. As seen in FIG. 5, the water level 62 will gradually lower as filtered water 54 flows through the filter media 52. When the water level 62 uncovers the dispensing container opening 34, an exchange of air and water, indicated in FIG. 5 by arrows 93, takes place through the opening 34 until the water pool again covers the opening 34. This exchange of air and water is enhanced by the ribs 88 which allow passage thereof between the entrance spout 32 and the opening 34.

The enclosure 80 also defines, on the exit spout 44, ribs 94 which enhance passage of air, indicated in FIG. 5 by arrows 95, from the container 40 as it is filled with filtered water 54. The ribs have steps 94a, 94b which are configured to fit various size beverage container openings. As shown in FIGS. 5 and 6, the one liter container 40 is retained over steps 94a while the one gallon container 70 is retained over steps 94b. The ribs 94 also define stops 94c, 94d which abut, respectively in FIGS. 5 and 6, the end of the container 40 and the container 70. It should be understood that the entrance spout 32 may also have steps, similar to those on the exit spout, for holding various sized container openings.

As seen in FIG. 9, the steps 94a extend radially to abut an imaginary circle with a diameter 98a. Similarly the steps 94b extend radially to abut an imaginary circle with a diameter 98b. Diameter 98a is preferably in the range of ¾ of an inch to one inch to accommodate one liter beverage containers (also 350 milliliter, 0.5 liter, 1.5 liter and 2 liter containers). Diameter 98b is preferably in the range of one to one and ¼ inches to accommodate one gallon beverage containers.

In a similar manner, as seen in FIG. 7, the ribs 88 extend radially to abut an imaginary circle with a diameter 99. Diameter 99 is preferably in the range of ¾ of an inch to one inch to accommodate commonly available beverage containers.

From the foregoing it should now be recognized that a method and apparatus therefor has been disclosed herein enabling a user thereof to conveniently fill readily available beverage containers with filtered tap water thus eliminating the need to purchase bottled water and/or install permanent or semipermanent filter devices. An apparatus in accordance with the invention can be manufactured economically from various plastics. It may be used repeatably and easily stored when not in use.

The preferred apparatus embodiment depicted herein is exemplary and numerous modifications, dimensional variations and rearrangements can be readily envisioned to achieve an equivalent result, all of which are intended to be embraced within the scope of the appended claims.

What is claimed is:

1. Water filter apparatus comprising:
   an enclosure defining an internal cavity, said cavity containing filter media;
   an entrance spout projecting from said enclosure, said entrance spout having an external surface dimensioned to be received in a neck opening of an inverted dispensing container so as to abut the internal surface of said neck opening;
   said entrance spout defining an internal passageway extending therethrough and communicating with said internal cavity;
   an exit spout projecting from said enclosure in a direction opposite to said entrance spout, said exit spout having an external surface dimensioned to be received in a neck opening of a receiving container so as to abut the internal surface of said neck opening;
   said exit spout defining an internal passageway extending therethrough and communicating with said internal cavity.

2. Apparatus as defined in claim 1 wherein:
   said entrance spout is cylindrical and has an outer diameter between ¾ of an inch and one inch; and
   said exit spout is cylindrical and has an outer diameter between ¾ of an inch and one inch.

3. Water filter apparatus, comprising:
   an entrance spout dimensioned to be received in the opening of an inverted dispensing container;
   an exit spout dimensioned to be received in the opening of a receiving container;

filter means accommodated between said entrance spout and said exit spout whereby water may flow from said dispensing container and filter through said filter means to said receiving container; and means for preventing water overflow comprising a buffer disposed about said entrance spout for pooling water to a level above said dispensing container opening.

4. Water filter apparatus, comprising:

an entrance spout dimensioned to be received in the opening of an inverted dispensing container;

an exit spout dimensioned to be received in the opening of a receiving container;

filter means accommodated between said entrance spout and said exit spout whereby water may flow from said dispensing container and filter through said filter means to said receiving container; and wherein said entrance spout defines spaced external ribs for abutting the inner surface of said dispensing container opening.

5. Apparatus as defined in claim 4 wherein said entrance spout ribs extend radially to abut an imaginary circle with a diameter between ¾ of an inch and one inch.

6. Water filter apparatus, comprising:

an entrance spout dimensioned to be received in the opening of an inverted dispensing container;

an exit spout dimensioned to be received in the opening of a receiving container;

filter means accommodated between said entrance spout and said exit spout whereby water may flow from said dispensing container and filter through said filter means to said receiving container; and wherein said exit spout defines spaced external ribs abutting the inner surface of said receiving container opening.

7. Apparatus as defined in claim 6 wherein each of said exit spout ribs define a first step and a second step for selection thereof to enhance the fit between said ribs and said receiving container opening.

8. Apparatus as defined in claim 7 wherein said exit spout ribs extend radially with each said first step abutting an imaginary circle with a diameter between one inch and one and ¼ inches and each said second step abutting an imaginary circle with a diameter between ¾ of an inch and one inch.

9. Water filter apparatus, comprising:

an enclosure defining a cavity for containing filter media;

said enclosure defining an exit spout communicating with said internal cavity;

a cap defining an entrance spout, said cap disposed over said cavity whereby water from an inverted dispensing container coupled to said entrance spout is directed through said cavity and any filter media contained therein to said exit spout;

said enclosure further defining a buffer extending around said entrance spout for accommodating a water pool to prevent water from said dispensing container overflowing from said apparatus.

10. Apparatus as defined in claim 9 wherein said exit spout defines spaced external ribs adapted to abut the inner surface of a receiving container opening.

11. Apparatus as defined in claim 10 wherein said exit spout defines on each of said ribs a first step and a second step for selection therefrom to enhance the fit between said ribs and said receiving container opening.

12. Apparatus as defined in claim 11 wherein said exit spout ribs extend radially with each said first step abutting an imaginary circle with a diameter between one inch and one and ¼ inches and each said second step abutting an imaginary circle with a diameter between ¾ of an inch and one inch.

13. Apparatus as defined in claim 9 wherein said entrance spout defines spaced external ribs adapted to abut the inner surface of a dispensing container opening.

14. Apparatus as defined in claim 13 wherein said entrance spout ribs extend radially to abut an imaginary circle with a diameter between ¾ of an inch and one inch.

15. A method enabling a user thereof to conveniently fill readily available beverage containers with filtered tap water thus eliminating the need to purchase bottled water and/or install permanent or semipermanent filter devices, the method comprising the steps of:

filling a dispensing container with tap water through a container neck opening;

coupling an entrance spout of a filter apparatus to said dispensing container neck opening;

coupling an exit spout of said filter apparatus to a neck opening of a receiving container;

inverting said dispensing container, said apparatus and said receiving container whereby water flows from said dispensing container through said entrance spout, said filter apparatus and said exit spout into said receiving container; and pooling water about said dispensing container opening with a buffer of said apparatus to prevent overflow therefrom.

16. A method enabling a user thereof to conveniently fill readily available beverage containers with filtered tap water thus eliminating the need to purchase bottled water and/or install permanent or semipermanent filter devices, the method comprising the steps of:

filling a dispensing container with tap water through a container neck opening;

coupling an entrance spout of a filter apparatus to said dispensing container neck opening;

coupling an exit spout of said filter apparatus to a neck opening of a receiving container;

inverting said dispensing container, said apparatus and said receiving container whereby water flows from said dispensing container through said entrance spout, said filter apparatus and said exit spout into said receiving container; and abutting the inner surface of said dispensing container opening with ribs externally formed on said entrance spout.

17. A method enabling a user thereof to conveniently fill readily available beverage containers with filtered tap water thus eliminating the need to purchase bottled water and/or install permanent or semipermanent filter devices, the method comprising the steps of:

filling a dispensing container with tap water through a container neck opening;

coupling an entrance spout of a filter apparatus to said dispensing container neck opening;

coupling an exit spout of said filter apparatus to a neck opening of a receiving container;

inverting said dispensing container, said apparatus and said receiving container whereby water flows from said dispensing container through said entrance spout, said filter apparatus and said exit spout into said receiving container; and abutting the inner surface of said receiving container opening with ribs externally formed on said exit spout.

18. Method as defined in claim 17 further comprising the step of selecting steps of said exit spout ribs to abut the inner surface of said receiving container opening to enhance the fit therebetween.

* * * * *